United States Patent [19]

Bruch et al.

[11] 4,096,065
[45] Jun. 20, 1978

[54] APPARATUS FOR AEROBIC TREATMENT OF ACTIVATED SLUDGE

[75] Inventors: Werner Bruch, Dormagen; Hans Guth, Leverkusen; Helmut Kühn, Odenthal-Gloebusch, all of Germany

[73] Assignee: Bayer Aktiengesellschaft, Leverkusen, Germany

[21] Appl. No.: 742,313

[22] Filed: Nov. 15, 1976

[30] Foreign Application Priority Data

Dec. 4, 1975 Germany .............................. 2554495

[51] Int. Cl.² .............................................. B01D 19/00
[52] U.S. Cl. ............................... 210/188; 55/204; 210/195 S; 210/205; 210/218; 210/220; 210/512 R
[58] Field of Search ................ 210/15, 48, 188, 195 S, 210/198 R, 205, 207, 218, 221 P, 256, 512 R, 220, 259–262, 519, 520, 539; 55/204

[56] References Cited

U.S. PATENT DOCUMENTS

| | | | |
|---|---|---|---|
| 3,017,951 | 1/1962 | Wiley | 210/188 |
| 3,163,508 | 12/1964 | Tuck et al. | 55/204 |
| 3,224,964 | 12/1965 | Derenk et al. | 210/15 |
| 3,291,315 | 12/1966 | Rossi | 210/512 R |
| 3,446,357 | 5/1969 | Gomella | 210/195 S |
| 3,574,331 | 4/1971 | Kurosawa et al. | 210/195 S |
| 3,984,321 | 10/1976 | Kaelin | 210/195 S |

*Primary Examiner*—Charles N. Hart
*Assistant Examiner*—Peter A. Hruskoci
*Attorney, Agent, or Firm*—Burgess, Dinklage & Sprung

[57] ABSTRACT

In an apparatus for the gasification of a biomass in an aqueous medium in the presence of organic substances degradable by the biomass, comprising a gasification tank, and a clearing chamber for the gasified water-containing biomass provided concentrically around the gasification tank, the gasification tank communicating with the clearing chamber through an inlet in the latter, the improvement wherein a. the gasification tank is from about 10 to 32 meters high, has a height/diameter ratio between approximately 40 and 0.2, is provided adjacent its floor with gas inlet points, and is connected via inlet pipes to at least one gas removal and flocculation cyclone;

b. the same liquid level in all the clearing chambers is maintained by means of an overflow channel at about 0.1 to 2 meters below the liquid level of the gasification tank; and c. a sludge removal pipe connects each clearing chamber with a collector pipe.

Advantageously the clearing chamber is funnel shaped.

10 Claims, 7 Drawing Figures

APPARATUS FOR AEROBIC TREATMENT OF ACTIVATED SLUDGE

With biochemical processes taking place aerobically, the quantity of oxygen required for the metabolism of the microorganisms (biomass) must be supplied and a specific oxygen concentration must be maintained. The oxygen necessary for waste water purification or fermentation is supplied to the liquid from the gas phase. This can be effected by means of surface aerators, jet nozzles, perforated floors or injectors. Jet nozzles are for example described in Chemie-Ingenieur Technik, 42, 474 (1970).

Injectors are for example described in the journal Chemie-Ingenieur-Technik 43 (1971) 6, 329–335. The injectors are similar in construction to water jet vacuum pumps, which produce a finely distributed air-water-mixture. Injectors are preferably arranged on the floor or directly above the floor of the activated sludge or fermentation tank (hereinafter termed gasification tank). This arrangement ensures uniform mixing in the entire gasification tank.

As the motive water of the injectors it is preferable to use the biomass/water mixture present in the tank, and in the special case of water treatment a mixture of activated sludge/waste water. The biomass and water are generally separated from one another (clearing) subsequent to gasification. The greater part of the deposited biomass is continuously returned from the clearing stage into the gasification tank. After the concentration and filtration of the sludge the excess can for example be supplied to a storage or further processing stage.

Known activated sludge tanks for waste water treatment generally take the form of ground level concrete tanks having a depth of up to 6 meters to which are connected spatially separated units for the separation of activated sludge and treated water. Suitable clearing units include in particular funnel tanks (so-called Dortmund wells).

These Dortmund wells are generally made of concrete and are connected by pipes or channels laid on the ground to the activated sludge tank. By the spatial separation of the activated sludge tank and clearing units and the distributor systems thus becoming necessary, high pressure losses or differences of level are produced between the activated sludge tanks and clearing tanks.

An apparatus is already known in which the aeration and clearing of the waste water takes place in a single tank. This apparatus consists of a preferably round tank having water depths of from approximately 3 to 5 meters and an activated sludge tank diameter of approximately 8 to 20 meters. Aeration is effected with surface aerators, gasification agitators or rotary devices. The clearing chamber is arranged concentrically about the activated sludge tank.

Since the concentric partition between the gasification chamber and clearing chamber lies approximately from 0.2 to 0.4 meters below the common liquid level and since large perforations are arranged at the bottom of both chambers, the flow from the gasification chamber is readily provided. In addition, a return of activated sludge through the floor perforations to the gasification tank is ensured. Excess activated sludge can be removed continuously or periodically from the clearing chamber.

The essential disadvantages of this known apparatus are that the turbulence which must necessarily be maintained in the gasification tank is also transmitted to the clearing chamber, as a result of which the conditions for the settling of the activated sludge are very unfavorable. Moreover, with this known apparatus the return of the activated sludge into the gasification tank takes place in a substantially uncontrolled manner. A further disadvantage is that in the case of the known apparatus, the flow moves horizontally through the clearing chamber which results in a lower surface load than in the case of a clearing chamber through which the flow moves vertically.

The object of the present invention is to eliminate the disadvantages of known apparatus and to provide an apparatus for carrying out biochemical processes which in the smallest possible space permits both optimum gasification of the biomass and clearing.

The present invention provides an apparatus for the gasification of a biomass in an aqueous medium in the presence of organic substances which can be degraded by the biomass in a gasification tank, comprising a clearing chamber for the gasified water containing the biomass provided concentrically about the gasification chamber, the gasification chamber and clearing chamber communicating with each other wherein a. a gasification tank which is about 10 to 32 meters high, whose height/diameter ratio is between approximately 40 and 0.2 and on whose floor or just above whose floor gas inlet points are arranged, having one or more concentrically suspended clearing chambers, is connected via inlet pipes to gas removal and flocculation cyclones, all clearing chambers having an equal liquid level;

b. the liquid level in the clearing chambers is adjusted by means of one or more overflow channels so that it lies between about 0.1 and 2 meters, preferably between about 0.3 and 1 meter below the liquid level of the gasification tank;

c. a number of sludge removal pipes corresponding to the number of clearing chambers leads into a collector pipe.

The gasification tanks according to the invention are preferably cylindrical towers having a height/diameter ratio between approximately 0.3 and 32, especially preferably between about 0.5 and 20. The height/diameter ratio can in its widest range lie between approximately 40 and 0.2. The water level in the gasification tank lies between approximately 10 and 32 meters, preferably about 18 to 26 meters. The gas inlet points preferably comprise injectors; it is advantageous to arrange these on the floor or just above the floor of the gasification tank preferably equidistant from one another.

If oxygen-containing gas in the gasification tank containing less than about 50% by volume is introduced into the water containing biomass which is under its own hydrostatic pressure, the individual inlet points are arranged at a distance of about 0.5 to 2 meters, measured from the center point of each gas inlet point, from one another. Each gas inlet point preferably has a cross-sectional area of from approximately 0.01 to 0.1m$^2$, each of which is loaded with about 100 to 1000 effective-m$^3$ gas per m$^2$ cross-sectional area per hour. The gas pressure of the gas introduced is between about 0.01 and 0.5 bars above the hydrostatic pressure at the gas inlet point (effective-m$^3$ is intended to mean the gas volume based on the gas pressure and gas temperature at the gas inlet point).

If an oxygen-containing gas containing at least about 50% by volume oxygen is introduced into the gasification chamber, then the individual inlet points are preferably at a distance of about 2 to 10 meters, measured from the center point of each gas inlet point. Each gas inlet point has a cross-sectional area of approximately 0.1 to 0.5 m$^2$, each of which is loaded with from 100 to 300 effective-m$^3$ gas per m$^2$ cross-sectional area per hour.

Here also the gas pressure of the gas introduced should be approximately 0.01 to 0.5 bars above the hydrostatic pressure at the gas inlet point.

Instead of injectors, single hole floors or jet nozzles can also be used. The gas containing oxygen is preferably supplied to the gas inlet point with a propellent liquid especially preferably with water containing biomass and/or unpurified waste water. The propellent liquid constitutes 5 to 50% by volume, preferably about 10 to 30% by volume of the gas throughput.

The invention will be further described with reference to the accompanying drawings wherein.

Figure 1:
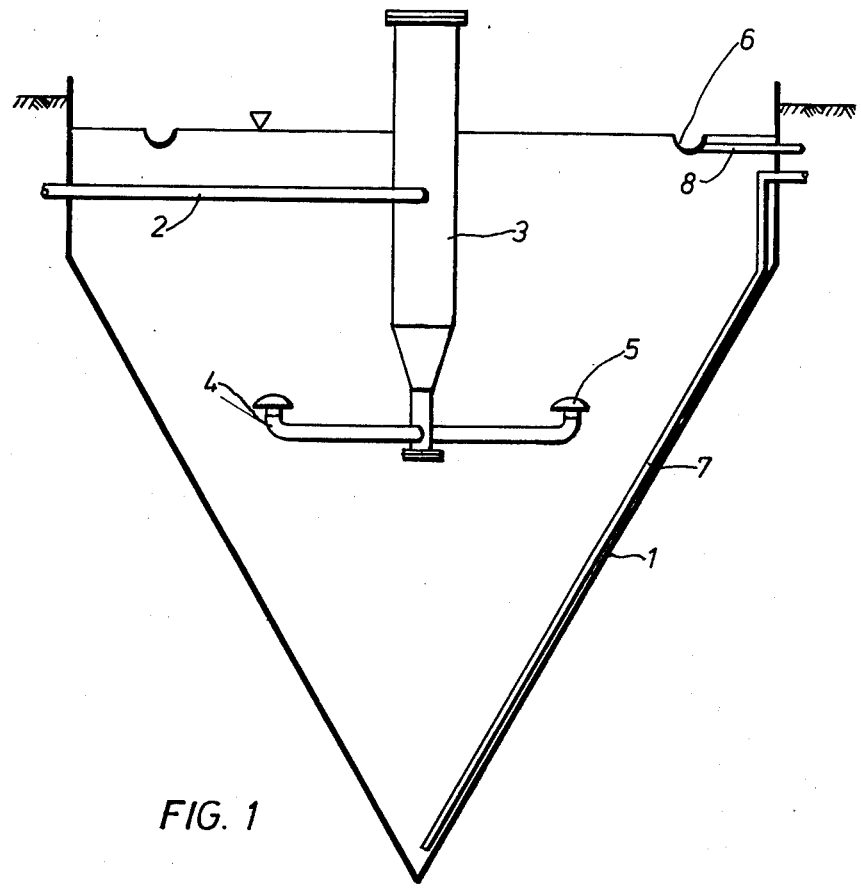
FIG. 1 is a schematic longitudinal sectional view through a prior art clearing unit, viz, a Dortmund well.

Referring now more particularly to the drawings, in the prior art device of FIG. 1 the reference characters indicate the following elements;

1. Funnel tank
2. Inlet pipe
3. Gas removal and flocculation cyclone
4. Distributor arms
5. Impingement plates
6. Overflow channel
7. Sludge discharge
8. Purified waste water outlet.

This apparatus functions as follows:

Water flowing through one or more inlet pipes 2 from a gasification tank (not shown) flows tangentially into the gas removal and flocculation cyclone 3, the coagulation of the sludge being accelerated by the intensive rotational movement and at the same time the air still present being driven out. Above one or more distributor arms 4 there are located impingement plates 5, which impart a horizontal flow component to the issuing waste water containing activated sludge. Purified waste water can be supplied via the overflow channel 6 and the outlet 8 to the receiving stream, while the deposited sludge can be removed via the pipe 7.

Figure 2:
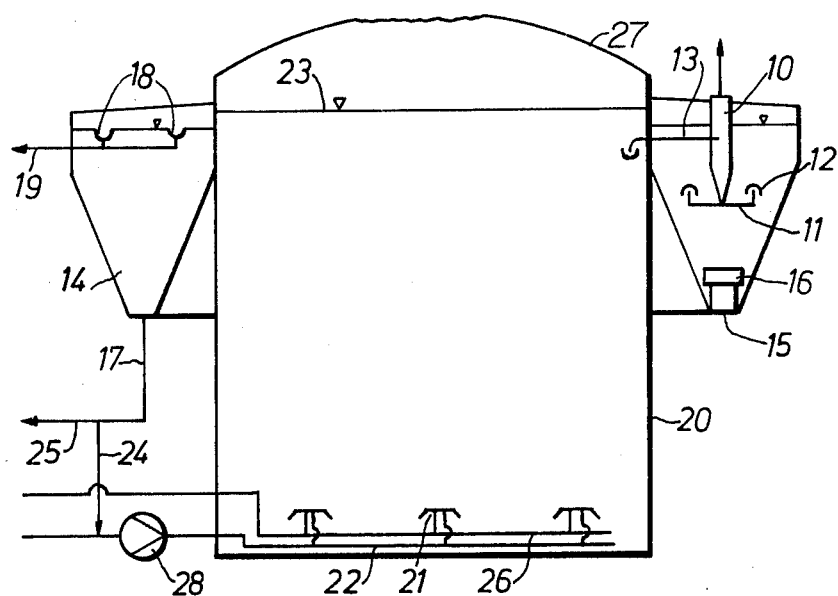
FIG. 2 is a schematic longitudinal sectional view of one embodiment of a gasification tank and clearing unit in accordance with the present invention.
Figure 2A:
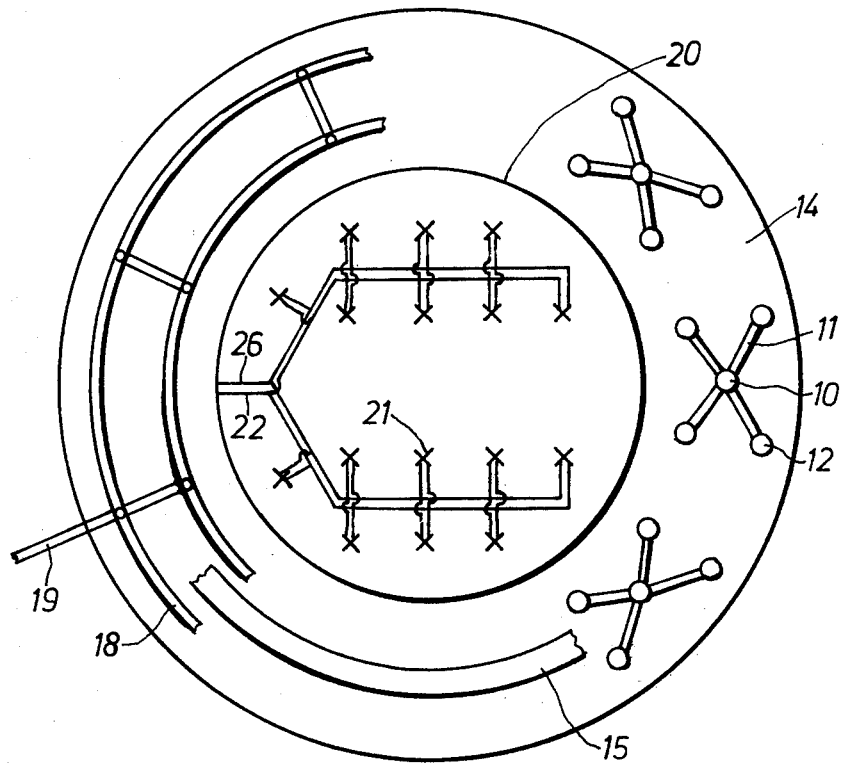
FIG. 2a is a plan view of the structure of FIG. 2.

With reference to FIGS. 2 and 2a, the reference numerals have the following meanings:

10 — Gas removal and flocculation cyclone
11 — Distributor arms
12 — Impingement plates
13 — Inlet pipe for water containing biomass
14 — Clearing chamber
15 — Annular chamber floor
16 — Evacuation device
17 — Biomass, discharge pipe (not shown)
18 — Overflow channel
19 — Outflow pipe for cleared water
20 — Gasification tank
21 — Gas inlet points
22 — Cooling pipes for water
23 — Water level
24 — Sludge return
25 — Excess sludge pipe
26 — Feed pipes for gas containing oxygen
27 — Cover
28 — Pump.

The liquid to be gasified is supplied to the gasification points 21 via pipes 22 with gas containing oxygen (e.g., air) supplied via 26.

The water level 23 in the gasification tank 20 is higher than that in the clearing chamber 14 by the amount of the pressure loss in the inlet pipes 13 and the gas removal and flocculation cyclones 10. The liquid to be cleared passes through one or more cyclones 10 and distributor arms 11 with impingement plates 12 arranged above them into the clearing chamber 14, which is arranged in annular manner around the gasification tank 20. The cleared liquid passes via the overflow channels 18 and outlet pipes 19 and in the case of waste water can be supplied either directly to the receiving water or to a further biological or chemical/physical treatment. The biomass forms a sediment in the clearing chamber 14 and is evacuated pneumatically, hydraulically or mechanically by means of an evacuation device 16 which for example moves around on the annular chamber floor 15. The biomass is removed via the pipe 17 on the annular chamber floor 15 and can be returned via a pump (not shown) and the pipe 24 to the intake pipe of the pump 28 to the gasification points or via a distributor pipe (not shown) on the gasification tank floor into the gasification chamber uniformly distributed. The excess proportion is led away via the pipe 25.

In the plan view of FIG. 2a, the overflow channels, cyclones and annular chamber floors extend over the whole circumference of the annular chamber; for the sake of clarity these parts are however only shown in segment.

Figure 3:
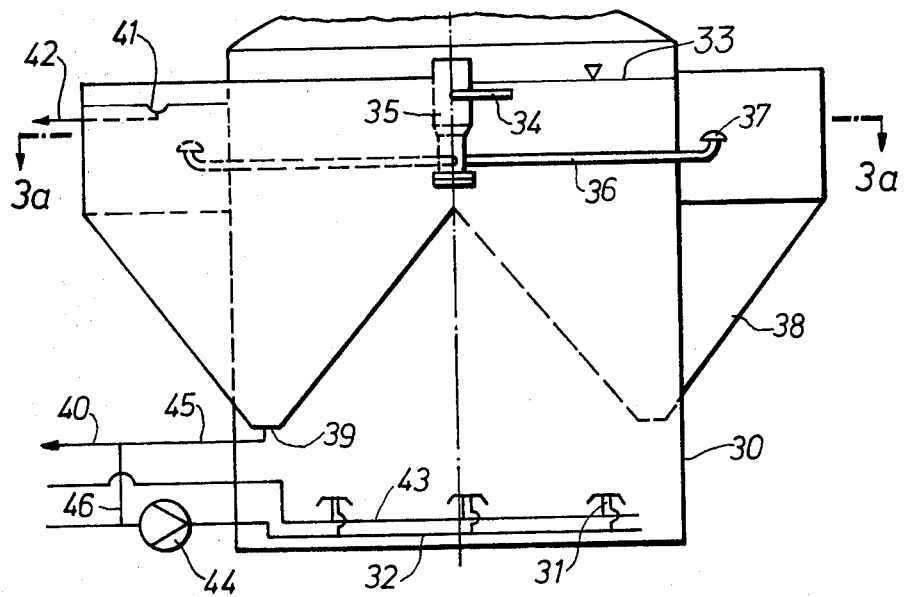
FIG. 3 is a schematic partial longitudinal sectional view of another embodiment in accordance with the present invention.
Figure 3A:
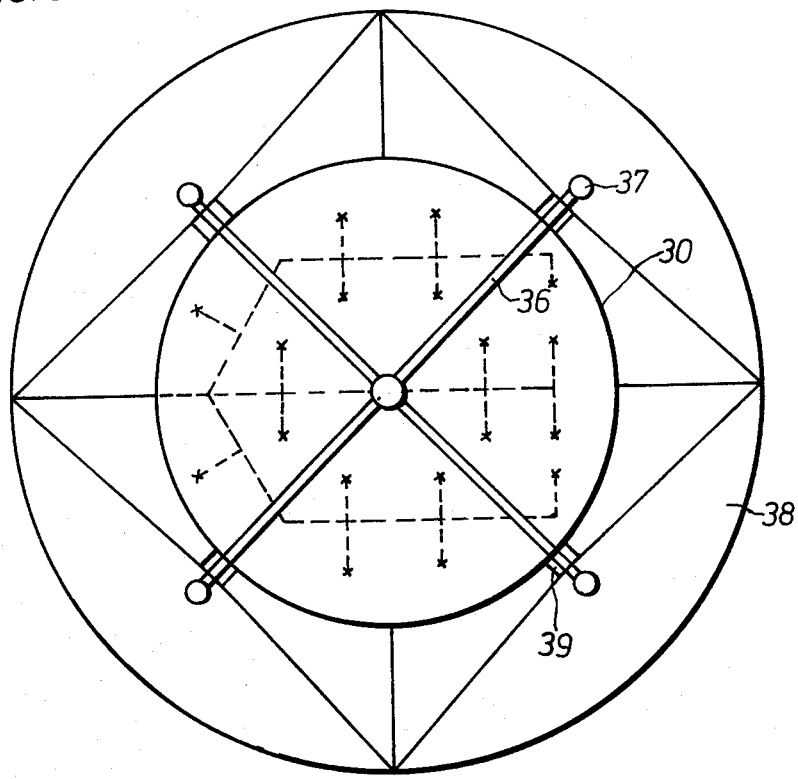
FIG. 3a is a sectional view taken along line 3a — 3a of FIG. 3.

The reference numerals in FIGS. 3 and 3a have individually the following meanings:

30 — Gasification tank
31 — Gasification points
32 — Feed pipe for gasifying liquid
33 — Water level
34 — Inlet pipe for water containing biomass
35 — Gas removal and flocculation cyclone
36 — Distributor arms
37 — Impingement plates
38 — Clearing chambers (4 units)
39 — Feed pipes
40 — Biomass removal
41 — Overflow channel
42 — Discharge pipe
43 — Feed pipes for gas containing oxygen
44 — Pump
45 — Biomass removal
46 — Biomass return.

In this arrangement the liquid to be gasified, introduced via the pump 44 and the feed pipe 32 together with gas containing oxygen supplied via the pipe 43, is guided to the gasification points 31 and pumped and distributed into the gasification tank 30. The water level 33 in the gasification tank 30 is higher than in the clearing chamber 38 by the amount of the pressure loss (approximately 200 to 500 mm) in the inlet pipes 34 and the gas removal and flocculation cyclone 35. The liquid to be cleared passes through the cyclone 35 and the distributor arms 36 with the impingement plates 37 arranged above them into the clearing chamber 38. In this arrangement the clearing chamber is sub-divided into four funnel shaped chambers. The funnels have a wall angle of approximately 45° to 75°, preferably about 55° to 65° relative to the horizontal. The cleared liquid passes out via the overflow channel 41 and the outlet pipe 42 and can for example in the case of waste water purification be supplied either directly to the receiving water or to a further biological or chemical/physical treatment. The sludge forms a sediment in the clearing chamber 38 which is in the form of four sludge funnels and can be returned uniformly distributed via the four floor pipes 39 and via a pump (not shown) and the pipe 46 into the intake pipe of the pump 44 into the gasification points or via a distributor pipe (not shown) on the gasification tank floor into the gasification chamber. The excess proportion of the biomass is removed via the pipe 40. (In FIG. 3a for the sake of clarity the overflow channel 41 is not shown).

A variant of the embodiment shown in FIG. 3 has eight identical funnel-shaped clearing chambers.

Figure 4:
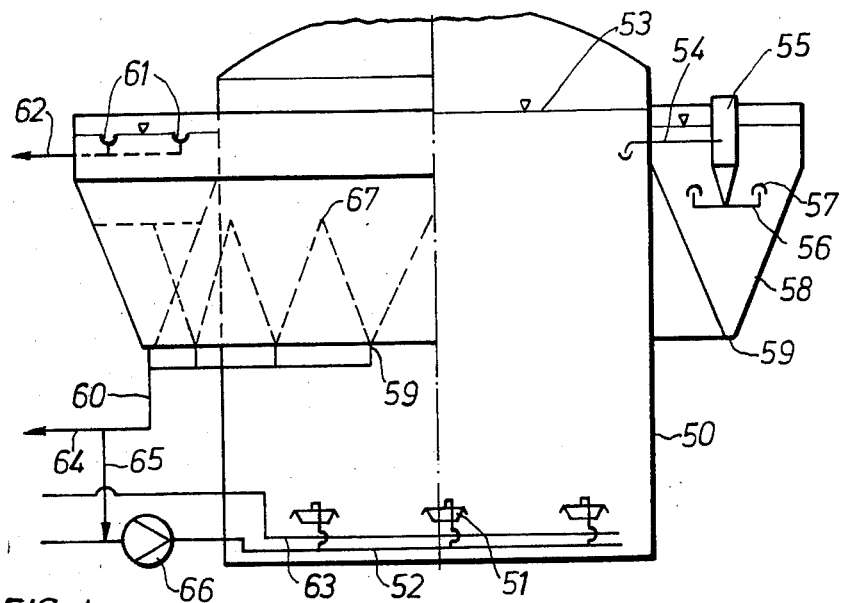
FIG. 4 is a schematic partial longitudinal sectional view of another embodiment in accordance with the present invention.
Figure 4A:
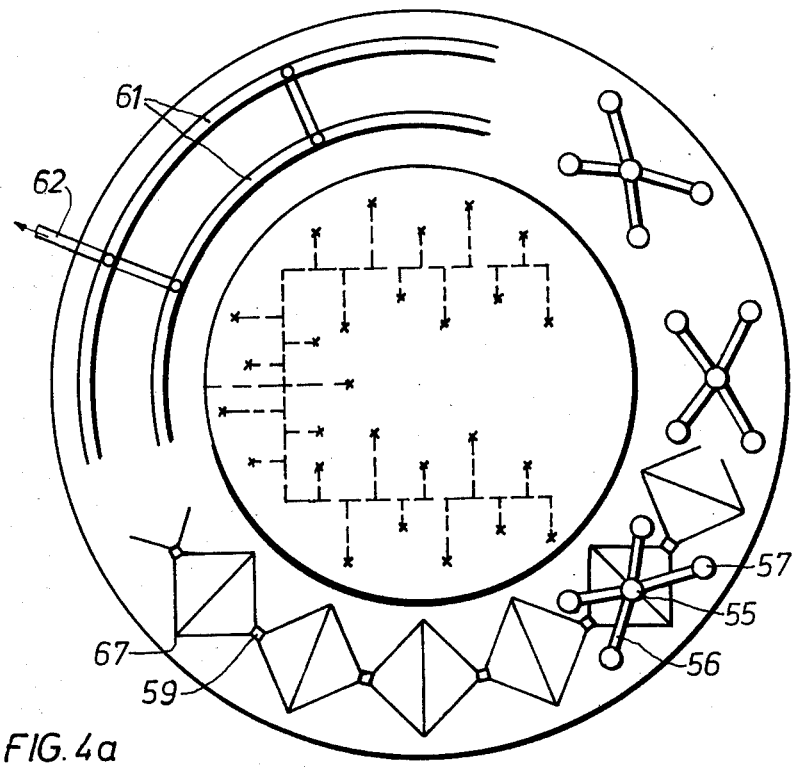
FIG. 4a is a plan view of the structure of FIG. 4.

The reference numerals in FIGS. 4 and 4a individually have the following meanings.

50 — Gasification tank
51 — Gasification points
52 — Feed pipes for water containing biomass
53 — Water level
54 — Inlet pipes
55 — Gas removal and flocculation cyclones
56 — Distributor arms
57 — Impingement plates
58 — Clearing chambers (16 units)
59 — Feed pipes
60 — Biomass removal
61 — Overflow channels
62 — Discharge pipes for cleared water
63 — Feed pipes for gas containing oxygen
64 — Excess biomass outlet
65 — Biomass return
66 — Pump.

The liquid to be gasified, introduced via the pump 66 and the feed pipe 52 is supplied to the gasification points 51 together with gas containing oxygen introduced via the feed pipe 63 and pumped into the gasification tank 50. The water level 53 in the gasification tank 50 is higher than in the clearing chamber 58 by the amount of the pressure loss in the inlet pipes 54 and the gas removal and flocculation cyclones 55. The liquid to be cleared passes preferably via several cyclones 55 and distributor arms 56 with impingement plates 57 arranged above them into the clearing chambers 58, of which 16 units are arranged in funnel form around the circumference of the gasification tank. The gas removal and flocculation cyclones can here as in the already described embodiments also be operated under a slight partial vacuum. Over each second saddle surface of consecutive clearing chambers there is arranged a gas removal and flocculation cyclone which can be supported on this saddle surface. At the point of each funnel there are short feed pipes 59, through which the deposited biomass can be returned uniformly distributed via a pipe 60, via a pump (not shown) and the pipe 65 to the intake pipe of the pump 66 to the gasification points or via a distributor pipe (not shown) on the gasification tank floor into the gasification chamber. The excess biomass proportion can be partially sluiced out via the pipe 64.

The cleared liquid can be removed via the overflow channels 61 and discharge pipe 62.

In FIG. 4a, overflow channels, cyclones and clearing chambers in communication via saddle surfaces are arranged over the whole circumference of the annular chamber. For the sake of clarity, these parts are only shown in segment in FIG. 4a.

If waste water is purified in the apparatus according to the invention, the purified waste water can subsequently be supplied via the overflow channels to the receiving water or with the pressure drop present to a further biological or chemical/physical treatment. Preferably in the case of passing into the receiving water, the level difference existing between the water level in the clearing chambers and the water level of the receiving water is exploited in order to reinforce the diverted waste water with oxygen. For this purpose the cleared waste water is preferably supplied to the pressure side of an injector and to the low side air or oxygen enriched air or technical oxygen is supplied, in order to maintain a desired oxygen content in the waste water.

With the apparatus according to the invention it is possible with space saving construction to undertake the optimum design and dimensioning of the gasification tank and of the clearing chambers. The apparatus according to the invention also permits excellent use of the pumping energy for all process stages and for the transport of the products formed.

It will be appreciated that the instant specification and examples are set forth by way of illustration and not limitation, and that various modifications and changes may be made without departing from the spirit and scope of the present invention.

What is claimed is:

1. In an apparatus for the gasification of a biomass in an aqueous medium in the presence of organic substances degradable by the biomass, comprising a gasification tank, and at least one clearing chamber for the gasified water-containing biomass provided concentrically around the gasification tank, the gasification tank communicating with each clearing chamber through an inlet in the latter, the improvement wherein,
  a. the gasification tank is from about 10 to 32 meters high, has a height/diameter ratio between approximately 40 and 0.2, is provided adjacent its floor with gas inlet points, and is connected via inlet pipes for introducing said gasified water-containing biomass to at least one gas removal and flocculation cyclone said cyclone including the outlet means for removing said gas and a distribution means for introducing flocculated sludge into said clearing chamber;
  b. means for maintaining the same liquid level in all of the clearing chambers comprising an over flow channel at about 0.1 to 2 meters below the liquid level of the gasification tank; and
  c. a sludge removal pipe connecting each clearing chamber with a collector pipe.

2. An apparatus according to claim 1, wherein the gasification tank has a height/diameter ratio between approximately 0.3 and 32.

3. An apparatus according to claim 1, wherein the gas removal and flocculation cyclone is arranged centrally in the gasification tank and is in communication via distributor arms with at least one clearing chamber.

4. An apparatus according to claim 1, wherein more than eight concentrically arranged clearing chambers are provided, and the cyclones are arranged in the clearing chambers.

5. An apparatus according to claim 1, further including an impingement plate in each clearing chamber located above the inlet.

6. An apparatus according to claim 1, wherein each clearing chamber is funnel shaped with a wall angle of about 45° to 75° to the horizontal.

7. An apparatus according to claim 1, wherein the gasification tank has a height/diameter ratio between approximately 0.5 and 20, each clearing chamber is funnel shaped with a wall angle of about 55° to 65° to the horizontal, and the overflow channel in each clearing chamber is arranged to provide a liquid lever about 0.1 to 2 meters below that in the gasification tank.

8. An apparatus according to claim 1, wherein the gas inlet points comprise injectors.

9. An apparatus according to claim 8, wherein the injectors are disposed equidistantly around the gasification tank.

10. An apparatus according to claim 1, wherein the clearing chambers are arranged concentrically around the top of the gasification tank.

* * * * *